(12) United States Patent
Bedosti et al.

(10) Patent No.: US 10,470,359 B2
(45) Date of Patent: Nov. 12, 2019

(54) FERTILIZER DISTRIBUTOR GROUP

(71) Applicant: MATERMACC S.P.A., San Vito al Tagliamento (PN) (IT)

(72) Inventors: Andrea Bedosti, Bologna (IT); Massimo Zubelli, Gualtieri (IT); Michele Trivillin, San Vito al Tagliamento (IT); Andrea Drecogna, Premariacco (IT)

(73) Assignee: MATERMACC S.P.A., San Vito al Tagliamento (PN) (IT)

( * ) Notice: Subject to any disclaimer, the term of this patent is extended or adjusted under 35 U.S.C. 154(b) by 71 days.

(21) Appl. No.: 15/758,661

(22) PCT Filed: Sep. 6, 2016

(86) PCT No.: PCT/IB2016/055314
§ 371 (c)(1),
(2) Date: Mar. 8, 2018

(87) PCT Pub. No.: WO2017/068442
PCT Pub. Date: Apr. 27, 2017

(65) Prior Publication Data
US 2018/0255703 A1 Sep. 13, 2018

(30) Foreign Application Priority Data

Oct. 20, 2015 (IT) .................. 102015000063531

(51) Int. Cl.
*A01C 7/20* (2006.01)
*A01C 5/06* (2006.01)
*A01C 7/06* (2006.01)

(52) U.S. Cl.
CPC .............. *A01C 7/201* (2013.01); *A01C 5/062* (2013.01); *A01C 7/06* (2013.01); *A01C 7/208* (2013.01)

(58) Field of Classification Search
CPC ......... A01C 7/201; A01C 7/205; A01C 5/062; A01C 5/064
See application file for complete search history.

(56) References Cited

U.S. PATENT DOCUMENTS

| 1,028,403 | A | * | 6/1912 | Towle | A01B 21/08 |
| | | | | | 172/462 |
| 2,124,198 | A | * | 7/1938 | Kriegbaum | A01C 15/006 |
| | | | | | 111/186 |
| 3,627,061 | A | * | 12/1971 | Sample | A01B 63/023 |
| | | | | | 172/462 |
| 4,528,920 | A | | 7/1985 | Neumeyer | |
| 5,499,685 | A | * | 3/1996 | Downing, Jr. | A01B 13/08 |
| | | | | | 111/140 |
| 2005/0172872 | A1 | | 8/2005 | Kaster et al. | |

FOREIGN PATENT DOCUMENTS

| EP | 0140190 A2 | 5/1985 |
| EP | 0261569 A2 | 3/1988 |
| EP | 2912933 A1 | 9/2015 |
| FR | 2058671 A5 | 5/1971 |

* cited by examiner

*Primary Examiner* — Alicia Torres
(74) *Attorney, Agent, or Firm* — Volpe and Koenig, P.C.

(57) ABSTRACT

An agricultural machine (10) comprising a bearing frame (11) and a plurality of fertilizer distributor devices (20), comprising at least a fertilizer distributor (21) associated to a disc (22), where the distributor devices (20) are supported by a mounting (25) associated to the bearing frame (11) by a resilient organ (27), the resilient organ (27) being a bending bar.

9 Claims, 5 Drawing Sheets

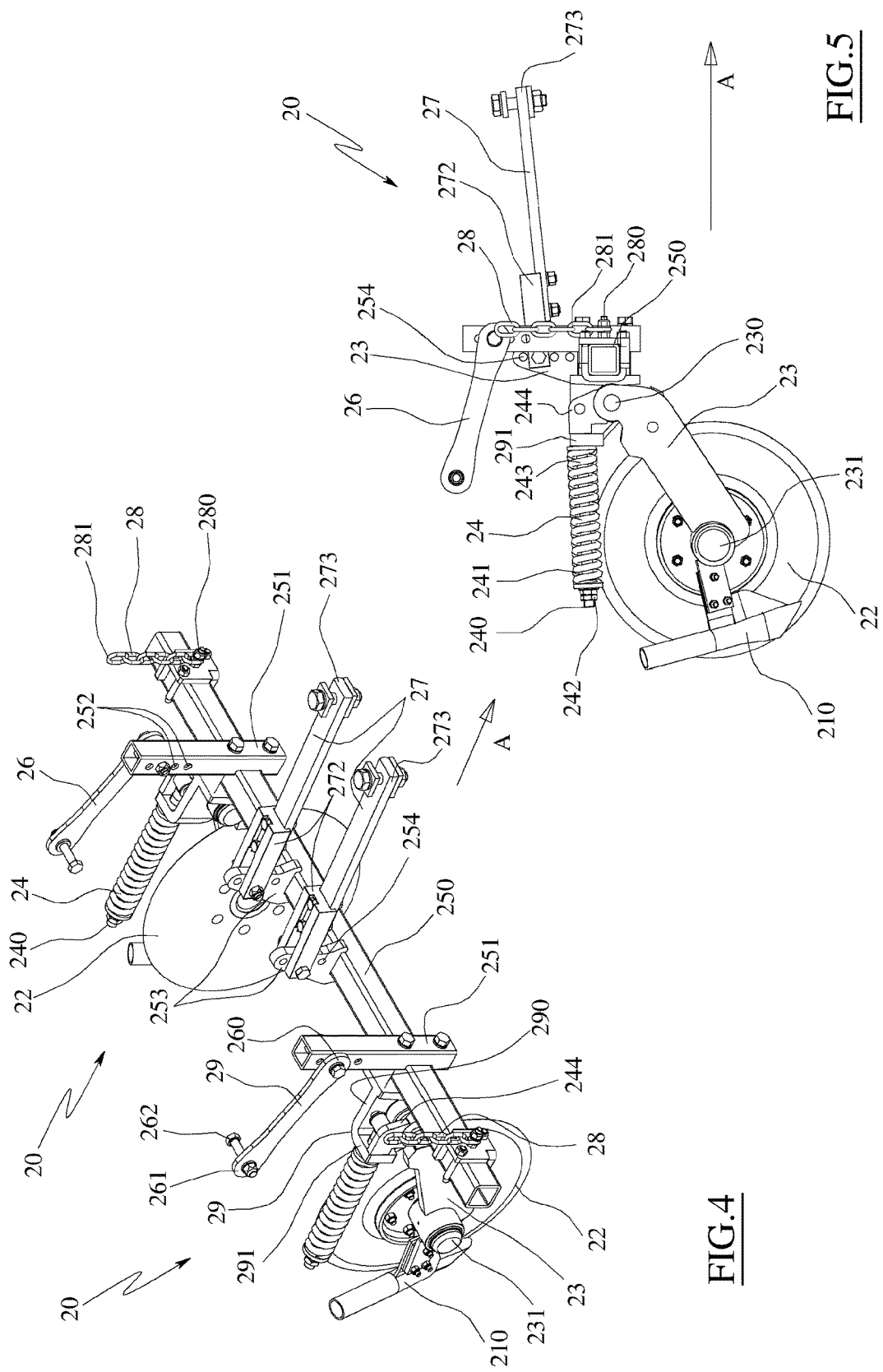

FERTILIZER DISTRIBUTOR GROUP

TECHNICAL FIELD

The present invention relates to a distributor device of fertilizer for an agricultural machine.

In particular the invention relates to a fertilizer distributor device and to an agricultural machine comprising the device.

PRIOR ART

As is known, in the sector of automated agriculture the use of a agricultural machines is known, both drawn and self-propelling, for dispensing material such as, for example, fertilizer, manure and/or seeds.

A typical example of these agricultural machines are precision seeders which comprise a plurality of seeding groups that are supported by a bearing frame which rests on the ground by means of at least a wheel, and is connected to a tractor for drawing the seeder itself.

Usually seeders also comprise a distributor device of fertilizer arranged upstream of the seeding units and able to lay the fertilizer in the ground before the seed is deposited.

The distributor devices of known type comprise a tank for the fertilizer provided with lower nozzles from which a distributor, for example of a pneumatic type, collects a batched quantity of fertilizer to be sown on the ground during the advancing of the seeder.

The fertilizer distributor devices comprise a distributor located in proximity of a disc able to lay the fertilizer and supported by a mounting via an oscillating arm in contrast to the action of a preload spring.

With the action of the preload spring the disc is maintained pressed against the ground for realisation of a groove in which the fertilizer is spread.

The preload spring enables the disc to perform oscillations with respect to the mounting so as to follow the progression of the ground and adapt to the irregularity thereof.

However, in known distributor devices the preload springs, being characterised by a considerable rigidity, do not enable large excursions of the disc, limiting the adaptability thereof to the ground.

An aim of the present invention is to obviate the above-mentioned drawbacks of the prior art, with a solution that is simple, rational and relatively inexpensive.

The aims are attained by the characteristics of the invention as reported in the independent claim. The dependent claims delineate preferred and/or particularly advantageous aspects of the invention.

DESCRIPTION OF THE INVENTION

An embodiment of the invention particularly relates to an agricultural machine comprising a bearing frame and a plurality of fertilizer distributor devices, comprising at least a fertilizer distributor associated to a disc, wherein the distributor devices are supported by a mounting associated to the bearing frame by means of a resilient organ characterised in that the resilient organ is a bending bar.

Further, the mounting is associated to the bearing frame by a hinge which enables a substantially vertical oscillation thereof and which comprises the resilient organ.

With this solution, the disc can oscillate vertically so as to follow the conformation of the ground, ensuring a large excursion even in the presence of significant variations of the profile of the ground without front-to-rear movements of the disc.

In a further aspect of the invention, the hinge comprises a con rod provided with an end constrained to the mounting and to an opposite end constrained to the bearing frame, and the resilient organ has an elongate body (for example a bending bar) provided with a first end constrained to the mounting and a second end constrained to the bearing frame.

With this solution, the hinge is easy and economical to manufacture.

In a further aspect of the invention, the distributor device comprises limiting means of the oscillation (vertical) of the mounting with respect to the frame of the resilient organ.

With this solution, the distributor device is prevented from vertically oscillating in an uncontrolled way, by defining a limit to the travel (lower).

For example, the limiting means of the oscillation comprise a chain fixed between the mounting and the bearing frame.

In this way the means are more economical to manufacture.

In a further aspect of the invention, the mounting is configured per oscillating with respect to the bearing frame about a substantially horizontal axis.

In this way, the distributor device has greater adaptability to the underlying ground In a further aspect of the invention, the disc is associated to the mounting by means of an oscillating arm contrasting an action of a preload spring.

In this way the disc has a further damping element that increases its adaptability to the underlying ground.

In a further aspect of the invention, the device comprises means for regulating a distance between the mounting and the bearing frame.

In this way the group is more versatile and can be associated to the bearing frame adequately for the working conditions.

BRIEF DESCRIPTION OF THE DRAWINGS

Further characteristics and advantages of the invention will emerge from a reading of the following description, provided by way of non-limiting example with the aid of the figures illustrated in the appended tables of drawings.

FIG. 4 is an axonometric view of the distributor device.

FIG. 5 is a lateral view of the distributor device.

BEST WAY OF CARRYING OUT THE INVENTION

Figure 1:
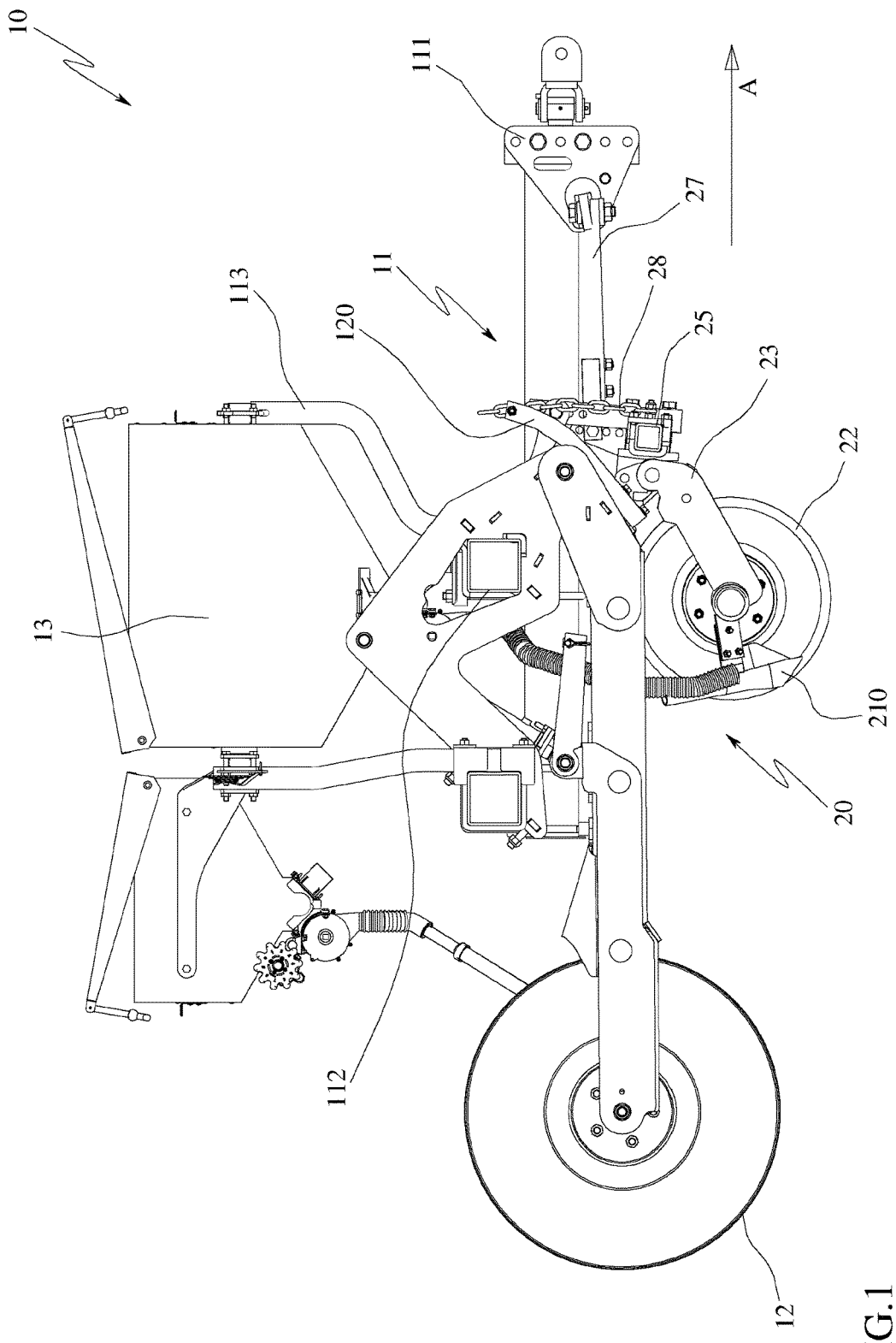
FIG. 1 is a lateral view of an agricultural machine.
Figure 2:
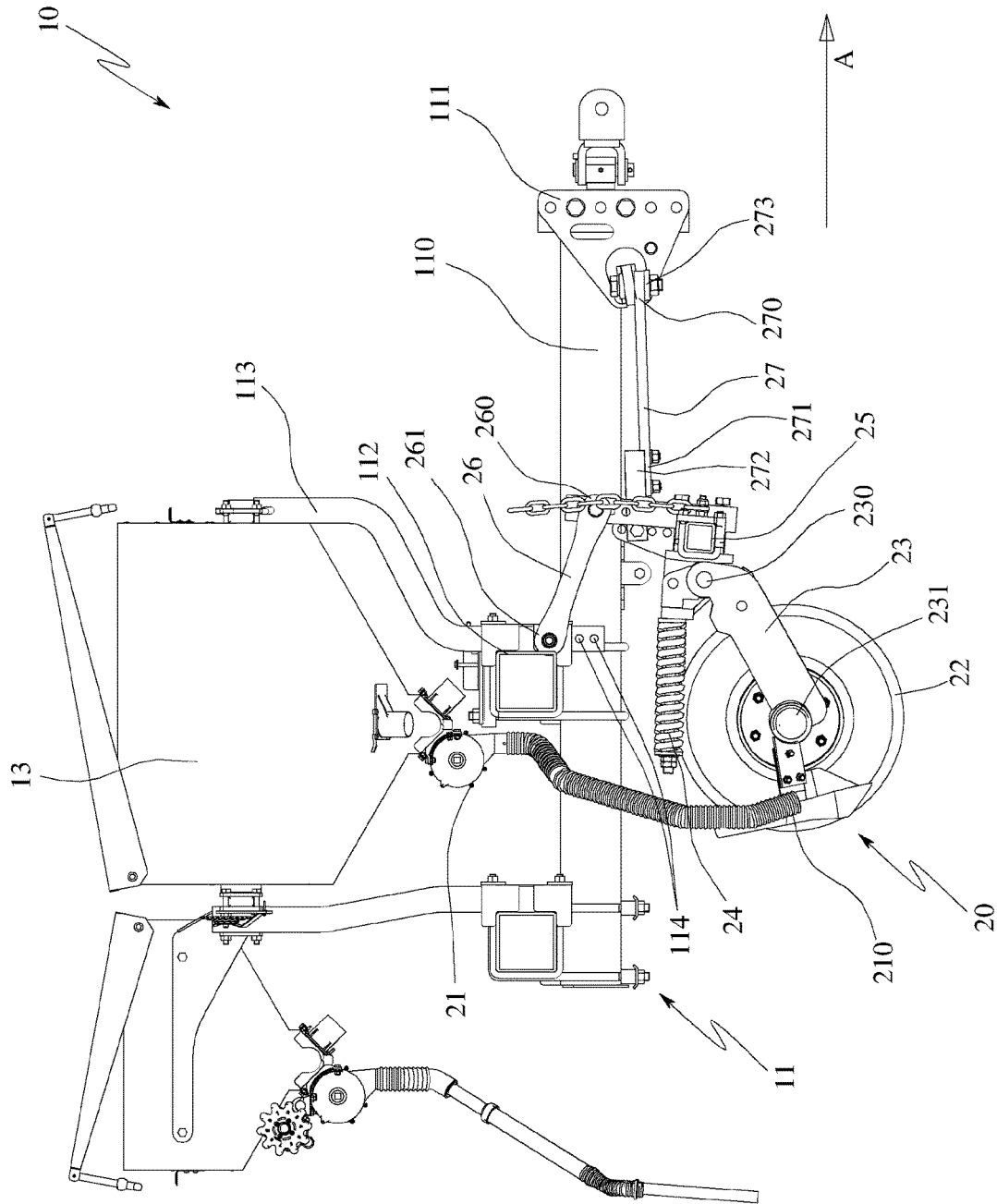
FIG. 2 is a lateral view of the agricultural machine of FIG. 1 from which the wheels have been removed.
Figure 3:
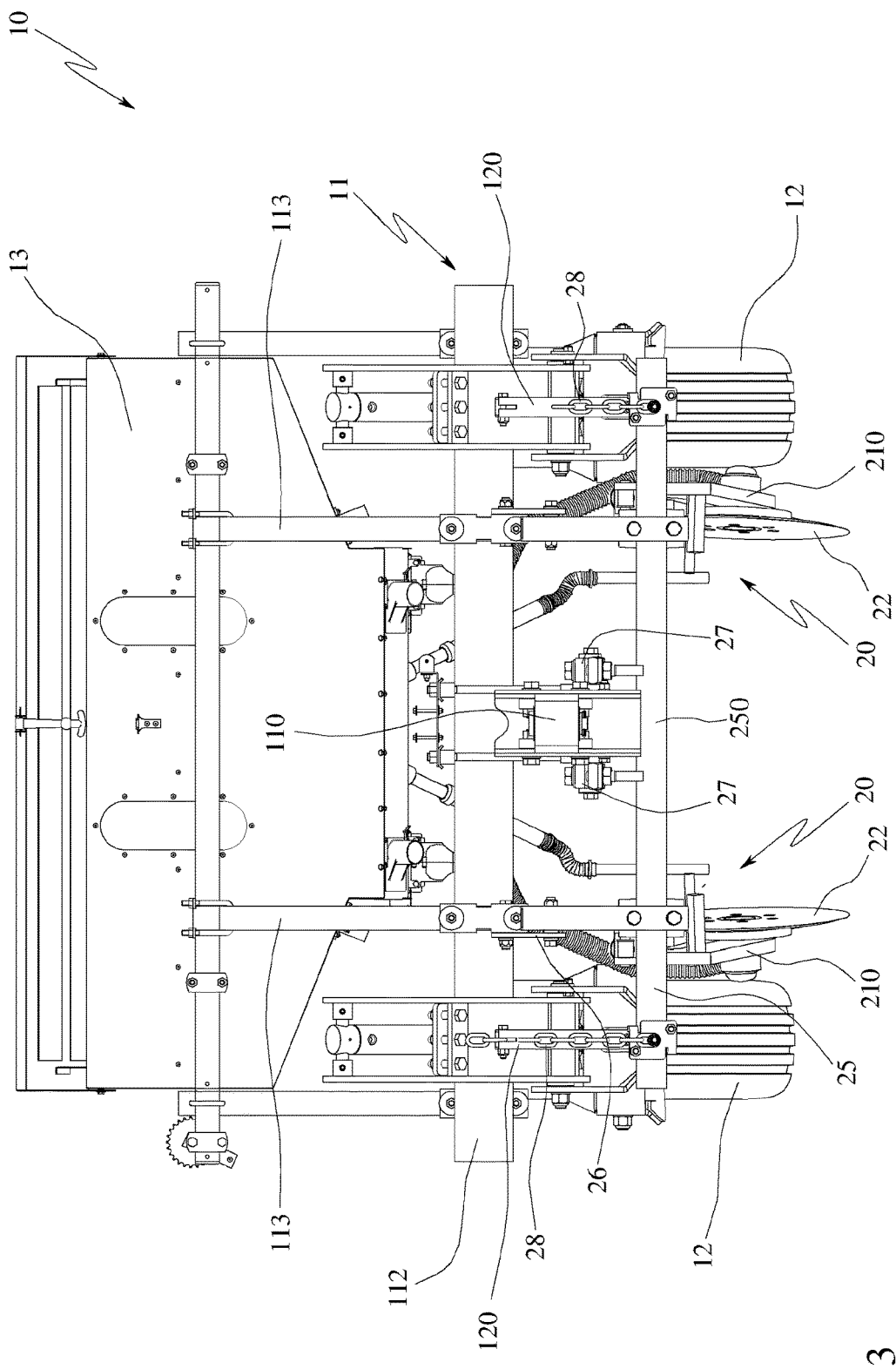
FIG. 3 is a front view of the agricultural machine of FIG. 1.
Figure 6:
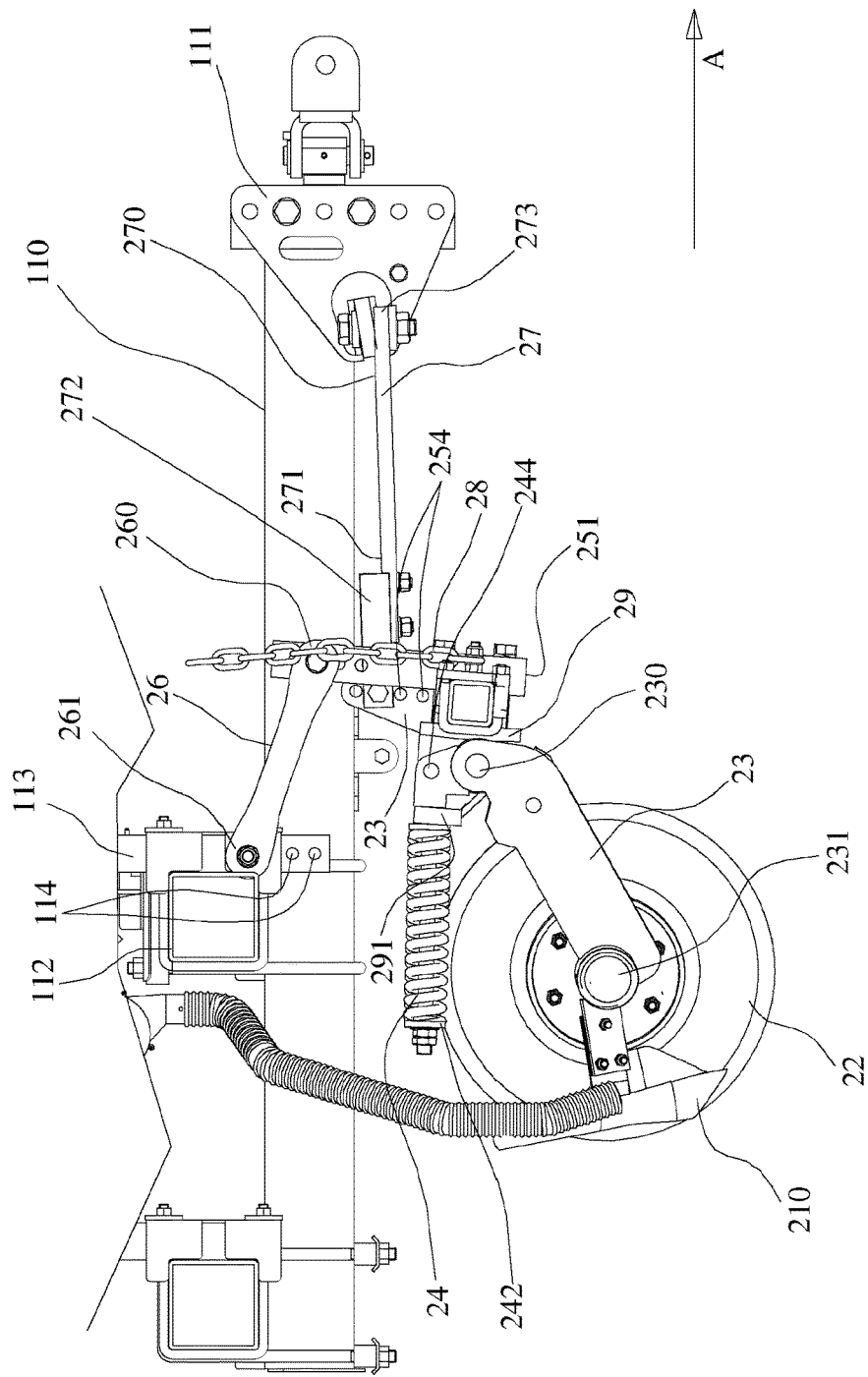
FIG. 6 is a larger-scale detail of the view of FIG. 2.

With particular reference to the figures, reference numeral 10 denotes in its entirety an agricultural machine for distribution of material.

The agricultural machine 10 can be for example a precision seeder; for the sake of simplicity and clarity the seeding units, being of known type, have been removed from the figures.

In the preferred embodiment and illustrated in the figures, the agricultural machine 10 is associable to a drawing vehicle, for example a tractor, of known type and not illustrated, so as to be able to advance along an advancement direction A for seeding the ground.

The agricultural machine 10 comprises a bearing frame 11 to which a pair of wheels 12 are connected which enable support and movement of the agricultural machine 10.

The wheels 12 are advantageously associated to an arm 210 hinged to the bearing frame 11, rotatable about a substantially horizontal axis (and perpendicular to the advancement direction A) in order to be able to rotate between a position in which the wheels 12 are resting on the ground (for road transport of the machine 10) and a position in which they are raised with respect to the ground (a working condition of the machine 10).

The bearing frame 11 comprises a tow bar 110 defined by a bar having a rectangular section and arranged substantially parallel to the advancement direction A.

The tow bar 110 comprises a pair of plates 111 having a substantially triangular shape fixed on opposite sides of the tow bar and in proximity of the end of the tow bar 110 that can be constrained to the tractor.

The bearing frame 11 further comprises a cross member 112 defined by a bar arranged substantially perpendicular to the tow bar 110 and fixed thereto, to which vertical supports 113 are fixed.

Each vertical support 113 comprises an end constrained to the cross member 112 and provided with a plurality of through-holes 114, for example three in number, arranged in succession along the vertical direction.

A tank 13 for the fertilizer can be fixed to the bearing frame 11, for example superiorly thereof, for example supported by the cross member 112 and the vertical supports 113, provided with lower nozzles from which a distributor device 20, for example of a pneumatic type, collects a batched quantity of fertilizer to be spread on the ground, for example upstream (in the advancement direction along the advancement direction A) of the seed release zone by the seeding unit, during the advancement of the agricultural machine 10 along the advancement direction A.

In particular, the machine 10 comprises a plurality of distributor devices 20 associated to the bearing frame 11, for example two in number.

The distributor devices 20 are supported by the bearing frame by means of a mounting 25.

In practice, each distributor device 20 comprises a pneumatic distributor 21, of known type and not described in detail, which comprises a tube connected to the tank 13 and having a free end 210 (lower) associated to a disc 22 (at the side thereof), which is supported by the bearing frame 11 by means of the mounting 25.

The mounting 25 is provided with a tubular bar 250, for example having a rectangular section, arranged with the longitudinal axis substantially perpendicular to the tow bar 110 and, further, arranged inferiorly of the tow bar 110.

The tubular bar 250 is arranged with respect to the tow bar 110 in such a way that it is substantially superposed on the median line of the tubular bar.

The mounting 25 further comprises a pair of vertical uprights 251 rising from the tubular bar 250 and arranged opposite one another with respect to the tow bar 110 in positions that are substantially proximal to the end of the tubular bar 250.

Each vertical upright 251 comprises a plurality of through-holes 252, for example three in number, arranged in succession along the longitudinal direction of the vertical uprights 251.

The mounting 25 further comprises a pair of profiled flanges 253 rising from the tubular bar 250 along a substantially vertical direction and arranged symmetrically to one another with respect to the tow bar 110, and are arranged in a substantially central portion of the tubular bar 250.

Each profiled flange 253 comprises a plurality of through-holes 254, for example four in number and arranged along a substantially vertical direction. The mounting 25 is associated to the bearing frame 11 by means of con rods 26 having a first end 260 constrained to the mounting 25 and a second end 261 constrained to the bearing frame 11.

Each con rod 26 comprises a first end 260 hinged, with respect to a substantially horizontal hinge axis by means of a pin, to a through-hole 252 of a respective vertical upright 251, and comprise a second end 261 hinged, with respect to a substantially horizontal hinge axis, by means of a respective pin 262, in a through-hole 114 of a respective vertical support 113.

In the embodiment shown in the figures, the second end 261 of each con rod 26 faces towards the rear portion of the corresponding distributor device 20 with respect to the advancement direction A.

In particular, the second end 261 of each con rod 26 is hinged to the respective vertical support 113, oscillatingly with respect to a substantially horizontal axis that is parallel to the advancement direction A.

In greater detail, the link pins 262 between the con rods 26 and the vertical support 113 are housed with play in the through-holes 114 of the vertical supports 113.

Further, the first end 260 of each con rod 26 is hinged to the respective vertical support 113, with no possibility of oscillating with respect to a substantially horizontal axis that is parallel to the advancement direction A.

The mounting 25 is further associated to the bearing frame 11 by means of at least a resilient organ 27 having a first end 270 constrained to the mounting 25 and a second end 271 constrained to the bearing frame 11.

The mounting 25 is preferably associated to the bearing frame 11 by means of a plurality of resilient organs 27, for example two in number.

Each resilient organ 27 has an elongate body 270 along a longitudinal direction thereof, for example a slim elastic leaf plate (or bending bar) or a leaf spring (for example having a rectangular section) preferably made of a material having predefined elastic characteristics, for example made of harmonic steel.

Each elongate body 270 comprises a first end 271 fixed to a forked body 272 hinged, with respect to a substantially horizontal hinge axis, by means of an appropriate pin, to a through-hole 254 of a respective profiled flange 253 of the mounting 25 and further comprises a second end 273 fixed to a respective plate 111 of the tow bar 110 of the bearing frame 11.

In the embodiment shown in the figures, the second end 273 of the elongate bodies 270 faces towards the front portion of the corresponding distributor device 20 with respect to the advancement direction A.

In particular, the first and the second ends 271, 273 can flex reciprocally by effect of the elasticity of the elongate body 270.

The mounting 25 is further associated to the bearing frame 11 by means of at least an elongate element, for example a chain 28, and preferably a pair of chains 28.

Each chain 28 is provided with an end fixed to the mounting 25, for example in the end portion of the tubular bar 250 (for example in an anterior position with respect to the advancement direction A), and an opposite end fixed to the bearing frame 11.

Each chain 28 is advantageously fixed to the mounting 25 and the bearing frame 11 by means of bolts 280 inserting in the links 281 of the chains 28 themselves, with the possibility of choosing the link 281 which is to be inserted by each bolt 280 so as to vary the length of the chain 28 between the mounting 25 and the bearing frame 11.

Further, each chain 28 is fixed to the bearing frame 11 at a respective support arm 120 of the wheels 12, so that in the movement of the wheels 12 between the lowered position and the raised position each arm 120 draws the respective chain 28 and with it the mounting 25 for raising and/or lowering it with respect to the bearing frame 11.

The mounting 25 further comprises brackets 29 for fastening the support arms 23 of the discs 22.

In the illustrated embodiment, the mounting 25 comprises a pair of brackets 29, each for each disc 22, fixed to the tubular bar 250 substantially at the same position to which the vertical uprights 251 are fixed.

Each bracket 29, for example, is projectingly fixed to the tubular bar 250 and projects posteriorly therefrom with respect to the advancement direction A.

Each bracket 29 is, for example, substantially L-shaped and comprises a first portion 290 fixed perpendicularly to the tubular bar 25 and a second portion 291 (perpendicular to the first portion 290) free and supported projectingly from the first portion 290.

Each support arm 23 of the wheels 22 is constrained to the mounting 25, for example to a respective bracket 29 and, in particular, is hinged with the hinge axis substantially horizontal (parallel to the longitudinal direction of the tubular bar 250 of the mounting 25). Further, each support arm 23 is hinged to the mounting 25 at a central portion thereof.

Each support arm 23 further comprises a profiled end 230 facing towards the tubular bar 250 and an opposite end 231 to which the respective disc 22 and the respective distributor 21 are fixed.

Further, each support arm 23 is configured so as to oscillate with respect to the mounting 25 in contrast to the action of the preload spring 2.

A preload spring 24 wound about a respective rod 240 is associated to each bracket 29.

Each preload spring 24 is provided with a first end 241 constrained to the rod 240 and in particular in abutment with a threaded organ 242 associated to the rod 240, and a second end 243 constrained to the bracket 29 for example in abutment against the surface of the second portion 291.

In the illustrated embodiment, the preload spring 24 has a rigidity which is greater than that of the resilient organs 27.

Each rod 240 is arranged with the longitudinal axis thereof substantially perpendicular to the longitudinal direction of the tubular bar 250 and substantially parallel to the advancement direction A.

Each rod 240 is housed slidably in a through-hole made in the second portion 291 of the bracket and, further, comprises a threaded end portion to which the threaded organ 242 is associated and an opposite end fixed to a profiled head 244 associated to the respective arm 23.

In particular, the profiled head 244 is conformed in a like way to the profiled end 230 of the respective support arm 23 and is associated thereto in such a way that oscillations of the support arm 23 take place in contrast to the action of the preload spring 24.

In practice, the discs 22 are maintained pressed on the ground by effect of the preload spring 24 and, by effect of the traction of the machine 10 by the tractor, can rotate about the axes thereof so as to lay the fertilizer released by the distributor 21.

During the traction of the machine 10 each disc 22 follows the conformation of the ground thanks to the preload springs 24 and the hinge defined by the bearing frame 11, the con rods 26, the resilient organs 27 and the mounting 25.

In particular, the oscillation of the discs 22 along the vertical from a lowered rest position to a raised position is in contrast to the action of the preload spring 24 and the return to the lowered position by effect of the elastic return of the preload spring 24. Further, the preload springs 24, being more rigid than the resilient organs 27, enable a more contained oscillation of the disc 22 with respect to what is enabled by the resilient organs 27.

Each preload spring 24 further enables the oscillation of the respective disc 22 independently of the other discs 22.

Likewise, the hinge which comprises the resilient organs 27 enables the oscillation of the mounting 25 along the vertical from a lowered rest position to a raised position in contrast to the action of the resilient organs 27 and the return to the lowered position by effect of the elastic return of the resilient organs 27. Further, the resilient organs 27, being more rigid than the preload springs 24, enable a greater oscillation of the mounting 25 along the vertical with respect to what is enabled by each preload spring 24.

In practice, each disc 22 is associated to the bearing frame 11 by means of two resilient members (the preload spring 24 and the resilient organ 27), for example positioned substantially in series, in which the one has an elastic resistance that is different with respect to the other (in the example each resilient organ 27 has a smaller elastic resistance than the one exhibited by each preload spring 24).

Further, the hinge which comprises the resilient organs 27 enables oscillation of the mounting 25 and with it the oscillation of all the discs 22 of the distributor device 20.

Further, the hinge comprising the resilient organs 27 enables oscillation of the mounting 25 about an axis that is substantially parallel to the advancement direction A in contrast to one of the resilient organs 27 (for example both with opposite forces).

The chain 28 acts as an endrun element (lower) of the oscillation relative to the vertical of the mounting 25, defining the lowered rest position.

Further, the distance of the mounting 25 from the bearing frame 11 can be modified by selecting which through-holes 114, 252, respectively of the vertical supports 113, of the bearing frame 11 and the vertical uprights 251 of the mounting 25, the con rods 26 are to be constrained to. At the same time the through-hole 254 of the profiled flanges 253 to which the resilient organ 27 is to be mounted can be changed, and it is further possible to modify the length of the chain 28.

The invention as it is conceived is susceptible to numerous modifications, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

The invention claimed is:

1. An agricultural machine (10) comprising:
a bearing frame (11) and
a plurality of fertilizer distributor devices (20),
wherein each fertilizer distributor device (20) comprises at least one fertilizer distributor (21) associated to a disc (22), and wherein the fertilizer distributor devices (20) and the discs (22) are supported by a mounting (25), each disc (22) being associated to the bearing frame (11) by means of two resilient organs (24, 27) positioned substantially in series, wherein one of the two resilient organs has an elastic resistance that is different with respect to the other one; the mounting (25) being associated to the bearing frame (11) by means of one (27) of the two resilient organs which is a bending bar.

2. The agricultural machine (10) of claim 1, wherein the mounting (25) is associated to the bearing frame (11) by a hinge (26, 27) which enables a substantially vertical oscillation thereof and which comprises the bending bar (27).

3. The agricultural machine (10) of claim 2, wherein the hinge comprises a con rod (26) provided with an end (260) constrained to the mounting (25) and an opposite end (261) constrained to the bearing frame (11), and the bending bar (27) has an elongate body (270) provided with a first end (271) constrained to the mounting (25) and a second end (273) constrained to the bearing frame (11).

4. The agricultural machine (10) of claim 2, further comprising limiting means (28) of the vertical oscillation of the mounting (25).

5. The agricultural machine (10) of claim 4, wherein the limiting means of the oscillation comprise a chain (28) fixed between the mounting (25) and the bearing frame (11).

6. The agricultural machine (10) of claim 1, wherein the mounting (25) is configured so as to oscillate with respect to the bearing frame (11) about a substantially horizontal axis.

7. The agricultural machine (10) of claim 1, wherein the disc (22) is associated to the mounting (25) by means of an oscillating arm (23) contrasting an action of the other of the two resilient organs which is a preload spring (24).

8. The agricultural machine (10) of claim 1, further comprising means (114,252,254) for regulating a distance between the mounting (25) and the bearing frame (11).

9. The agricultural machine (10) of claim 7, wherein the elastic resistance of the bending bar (27) is lower than the elastic resistance of the preload spring (24).

* * * * *